No. 609,207. Patented Aug. 16, 1898.
N. H. MEDBERY.
VALVE COUPLING.
(Application filed July 23, 1897.)
(No Model.) 2 Sheets—Sheet 1.
Fig. 1.
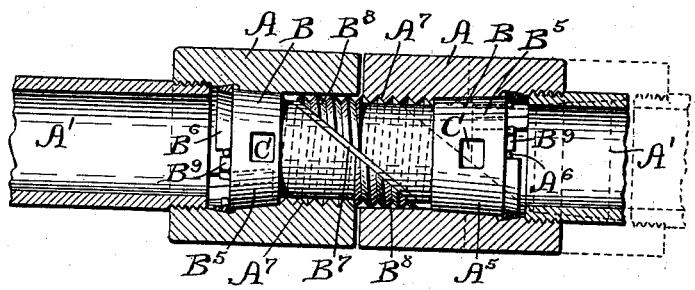
Fig. 2.
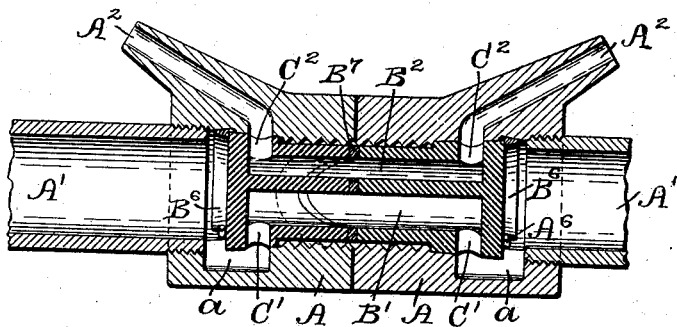
Fig. 3. Fig. 4. Fig. 5.
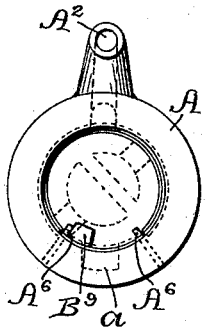 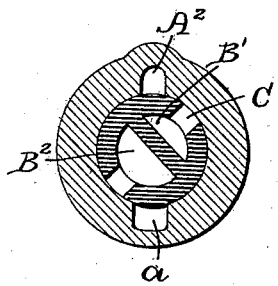 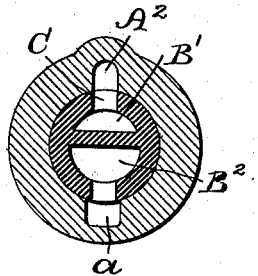
WITNESSES: INVENTOR:
Chas. H. Luther Jr. Nelson H. Medbery
B. M. Simms. by Joseph A. Miller & Co.
Attys.
THE NORRIS PETERS CO., PHOTO-LITHO., WASHINGTON, D. C.

No. 609,207. Patented Aug. 16, 1898.
N. H. MEDBERY.
VALVE COUPLING.
(Application filed July 23, 1897.)

(No Model.) 2 Sheets—Sheet 2.

WITNESSES: INVENTOR:
Chas. H. Luther Jr Nelson H. Medbery
B. M. Simms by Joseph A. Miller & Co.
Attys.

UNITED STATES PATENT OFFICE.

NELSON H. MEDBERY, OF EAST PROVIDENCE, RHODE ISLAND.

VALVE-COUPLING.

SPECIFICATION forming part of Letters Patent No. 609,207, dated August 16, 1898.

Application filed July 23, 1897. Serial No. 645,707. (No model.)

*To all whom it may concern:*

Be it known that I, NELSON H. MEDBERY, of East Providence, in the county of Providence and State of Rhode Island, have invented a new and useful Improvement in Valve-Couplings; and I hereby declare that the following is a full, clear, and exact description of the same, reference being had to the accompanying drawings, forming part of this specification.

The invention has reference to an improvement in the construction of couplings used to connect two or more conduits together. In railroad-trains, and particularly trains made up of passenger-coaches, conduits are used to carry steam to the several cars, conduits for conveying air to the brakes of the several cars, and, frequently, conduits connecting the several cars with a pneumatic signal. In other arts air, gas, and liquid conveying conduits have to be connected with and disconnected from apparatus in which they are used. In the attachments used to carbonate and force beer from the barrel to the tap the carbonic-acid pipe and the beer-pipe have to be each separately coupled or connected.

The object of the invention is to provide a coupling by which two or more conduits may be connected simultaneously.

Another object of the invention is to provide a coupling in which the conduits or passages are closed by the act of uncoupling and opened by the act of coupling the parts together; and to this end the invention consists in the peculiar and novel construction of the coupling, as will be more fully set forth hereinafter.

Figure 6:
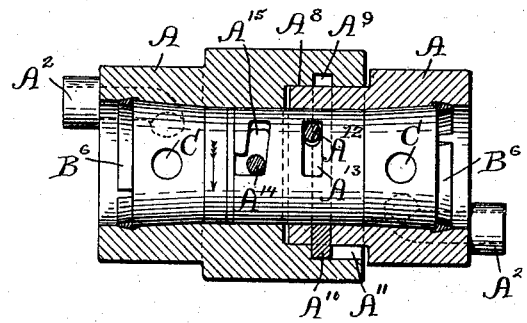
Figure 7:
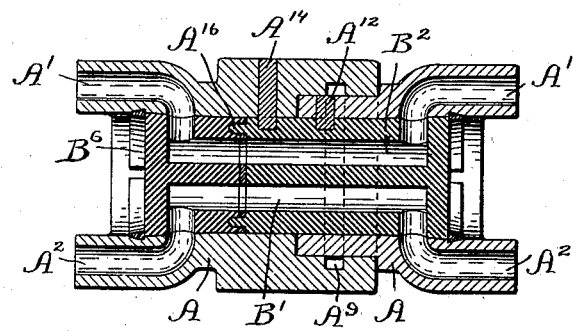
Figure 8:
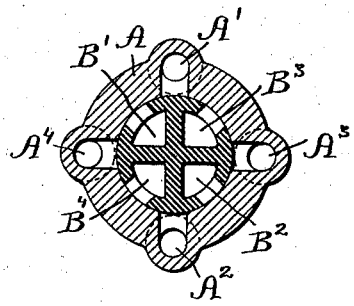

Figure 1 is a sectional view of my improved valve-coupling, showing the same connected in solid lines and in the disconnected position in broken lines, the valve part of the coupling being shown in the view. Fig. 2 is a sectional view at right angles to the view in Fig. 1 and taken through the center of the coupling and the valve. Fig. 3 is an end view; Fig. 4, a transverse sectional view through the ports, showing the valve in the closed position; Fig. 5, a sectional view through the ports, showing the valve in the open position. Fig. 6 is a sectional view of a coupling and a view of the two-part valve connected by means of a bayonet attachment in place of the screw attachment shown in Figs. 1 and 2. Fig. 7 is a sectional view of the two-part coupling and the two-part valve shown in Fig. 6. Fig. 8 is a sectional view showing a modified form of the coupling, showing four ports and the central valve provided with four ducts, so that connections may be made between four ducts by connecting the coupling.

Similar reference-marks refer to corresponding parts in all the figures.

In the drawings, A A indicate the two couplings, and B B the valves in the couplings. The couplings are provided with two or more ducts, as shown in the drawings. They have the ducts $A'$ and $A^2$ in all the figures except Fig. 8, which has in addition thereto the ducts $A^3$ and $A^4$. The valves B B have a corresponding number of ducts. In all the figures except Fig. 8 they have the ducts $B'$ and $B^2$, while in Fig. 8 there are in addition thereto the ducts $B^3$ and $B^4$. Each one of the ducts in the valves B B is provided with a port C, which when opposite the ducts in the couplings forms a passage through the coupling between the ducts connected with the opposite ends of the coupling.

Referring now to Figs. 1 and 2, the valves B B have the cylindrical slightly-conical ends $B^5$, fitting in corresponding conical sockets $A^5$, formed in each of the two coupling parts A A. The split spring-ring $B^6$, placed in a conical groove in the coupling, bears on the closed end of the valve B and holds the same in place when the coupling is disconnected. The two valves B B overlap each other on the diagonal line $B^7$, and a suitable packing-ring may be placed into the joint, preferably secured to one of the inclined faces of the diagonal extensions $B^7$. The end portions of the valves B B are provided with screw-threads $B^8$ and the couplings with screw-threads on part of the interior surface, so that the screw-threaded ends of the valves enter the unthreaded portion of the socket of the coupling, and by a partial rotation of the valves the screw-threaded portions of the valves will enter the screw-threads formed in the sockets of the coupling and thus secure the valves and couplings together. The closed ends of the valves are each provided with a projecting boss B⁹ and the couplings with the stops A⁶ A⁶. The ducts A² A² connect, when the coupling is secured, with the ports C² C² and the duct B², while the ducts A' A' connect through the chambers a a (shown in Fig. 2) with the ducts C' C' and the duct B', extending through the valve.

In connecting the coupling the two parts are held so that the screw-threaded ends of the valves B B enter the opposite sockets of the two parts of the coupling on the unthreaded portions of the sockets until the diagonal faces B⁷ are in close contact. The two parts of the coupling are now partially turned in opposite directions. The stops A⁶ come in contact with the bosses B⁹ on the valves B and turn the valves so that the screw-threaded ends of the valves enter the partial screw-threaded portion A⁷ of the sockets and draw the valves and couplings together and also bring the ports C in the valves opposite the ducts in the coupling.

In separating the coupling the other stops A⁶ come in contact with the bosses B⁹ on the closed ends of the valves and turn the valves to close the ports C C, while the ends of the valves turn out of the screw-threaded portion of the coupling, thereby closing the ports in the act of uncoupling and opening the ports in the act of coupling and dispensing with the use of auxiliary valves for controlling the several ducts.

In the modified form shown in Figs. 6, 7, and 8 the two parts of the valves are secured together by means of a bayonet-joint and are turned so as to open or close the ports by a pin projecting from one of the two parts of the coupling into a slot on the part of the valve connected with the coupling. In this construction one of the couplings is provided with the socket A⁸, and in this socket is formed the annular groove A⁹. The other coupling has a sleeve which enters the socket A⁸ and is provided with the pin A¹⁰, which enters the groove A⁹ by the longitudinal groove A¹¹. This part of the coupling is also provided with the pin A¹², which extends into the slot A¹³ in the valve B. The part of the coupling A provided with the socket A⁸ has the pin A¹⁴, which enters the cam-slot A¹⁵, formed in the surface of the valve B. The two parts of the valve B are, in the act of connecting the coupling, secured together by means of two or more dowel-pins A¹⁶.

Fig. 6 shows the two parts of the coupling brought together. The valves may be separated by moving the two parts of the coupling longitudinally. The coupling may be connected by turning one part so that the pin A¹⁰ enters the annular groove A⁹. This is usually done by turning the part of the coupling on the right hand of the figure, and this movement brings the pin A¹² to the opposite end of the slot A¹³ and also brings the ducts of that end of the coupling opposite the ports C C in one end of the valve. The two parts of the valve now turn, together with the right-hand end of the coupling, the pin A¹⁴ enters the cam-slot A¹⁵, and the ports on the opposite end of the valve B are brought opposite the ducts in the coupling. In coupling, the pin A¹² moves the length of the slot A¹³. This closes the ports on the right-hand end of the coupling. A further turn closes the ports of the left-hand end of the coupling and moves the pin A¹⁴ into the position in the slot A¹⁵ shown in Fig. 6, when the two parts of the coupling may be drawn apart with all the ducts closed. One-eighth of a turn of one end of the coupling connects the coupling and opens all the ports, so that two or more ducts can thus be simultaneously connected. One-eighth of a turn also disconnects the coupling and closes all the ports, so that no auxiliary valves are required, and two or more ducts may be thus connected or disconnected at one simple operation.

Having thus described my invention, I claim as new and desire to secure by Letters Patent—

1. The combination with the two parts of a coupling each provided with two or more ducts, of a two-part valve, longitudinally divided into two or more ducts, closed at the opposite ends and provided with two or more ports, the said two-part valve being connected by the two parts of the coupling and the ducts connected by the partial rotation of the valve; whereby two or more ducts may be simultaneously connected or disconnected, as described.

2. In combination, the two parts of a coupling, and connections for securing the coupling together, ducts connecting with the coupling, a two-part rotatable, cylindrical valve one part in each of the two parts of the coupling and ports in ends of the valve; whereby, on partially turning the valve, the ports in the valve and ducts in the coupling are connected, and the two parts of the coupling are locked together, as described.

3. In combination, the two parts of a coupling, two or more ducts connecting with the two parts of the coupling, connections for securing the two parts of the coupling together, a two-part cylindrical valve one part connected with each of the two parts of the coupling, two or more ducts in the valve and ports in the valve for connecting the ducts in the valve with the ducts in the coupling, whereby, by the partial rotation of the valve, two or more passages are opened through the coupling, as described.

4. In a coupling, the combination with one part of the coupling provided with two or more ducts near one end, a socket A⁸ and the annular groove A⁹ connecting with the groove A¹¹ on the other end and the pin A¹⁴ of the other part of the coupling provided also with two or more ducts and with the pins A¹⁰ and A¹², the two-part cylindrical valve B having two or more ducts and the dowel $A^{16}$ connecting the two parts of the valve, the ports C C near the closed ends of the valve, the slot $A^{13}$, and the cam-slot $A^{15}$; whereby the coupling parts are secured together and the valve is operated to open the ports in coupling and close the ports in uncoupling, as described.

In witness whereof I have hereunto set my hand.

NELSON H. MEDBERY.

Witnesses:
JOSEPH A. MILLER, Jr.,
M. F. BLIGH.